(12) United States Patent  
McWilliams

(10) Patent No.: US 9,088,810 B2  
(45) Date of Patent: *Jul. 21, 2015

(54) APPARATUS, SYSTEM AND METHOD FOR AUDIO-VISUAL CONTENT VIEWING USING ADVERTISEMENT CREDIT

(71) Applicant: Thomas J. McWilliams, Bryn Mawr, PA (US)

(72) Inventor: Thomas J. McWilliams, Bryn Mawr, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/151,953

(22) Filed: Jan. 10, 2014

(65) Prior Publication Data

US 2014/0137141 A1    May 15, 2014

Related U.S. Application Data

(63) Continuation of application No. 13/065,883, filed on Mar. 31, 2011, now Pat. No. 8,656,428.

(60) Provisional application No. 61/341,593, filed on Apr. 1, 2010.

(51) Int. Cl.
| | | |
|---|---|---|
| H04N 5/445 | (2011.01) | |
| H04N 7/173 | (2011.01) | |
| H04N 21/2543 | (2011.01) | |
| H04N 21/2747 | (2011.01) | |
| H04N 21/472 | (2011.01) | |
| H04N 21/81 | (2011.01) | |
| H04N 21/235 | (2011.01) | |

(52) U.S. Cl.  
CPC ....... *H04N 21/25435* (2013.01); *H04N 21/235* (2013.01); *H04N 21/2747* (2013.01); *H04N 21/47202* (2013.01); *H04N 21/812* (2013.01)

(58) Field of Classification Search  
CPC ................. H04N 7/173; H04N 5/445  
USPC .................. 725/1, 36, 42, 100, 104  
See application file for complete search history.

(56) References Cited

U.S. PATENT DOCUMENTS 8,656,428 B2 * 2/2014 McWilliams .......... 725/42

* cited by examiner

*Primary Examiner* — Kie Oanh T Bui  
(74) *Attorney, Agent, or Firm* — Barnes & Thornburg LLP; Thomas J. McWilliams; Edward F. Behm, Jr.

(57) ABSTRACT

An alternative system and method for charging to provide audio visual services typically made available by providers, namely DVR services, rDVR services, on-demand services, broadcast and switch video television services, and pay-per-view services, for example. A customer/user may be enabled to access certain services from a provider in exchange for viewing one or more commercials, advertisements, overlays, watermarks, logos, or the like, preferably in real time, before, during, or following viewing an audio visual work provided in accordance with the services.

10 Claims, 3 Drawing Sheets

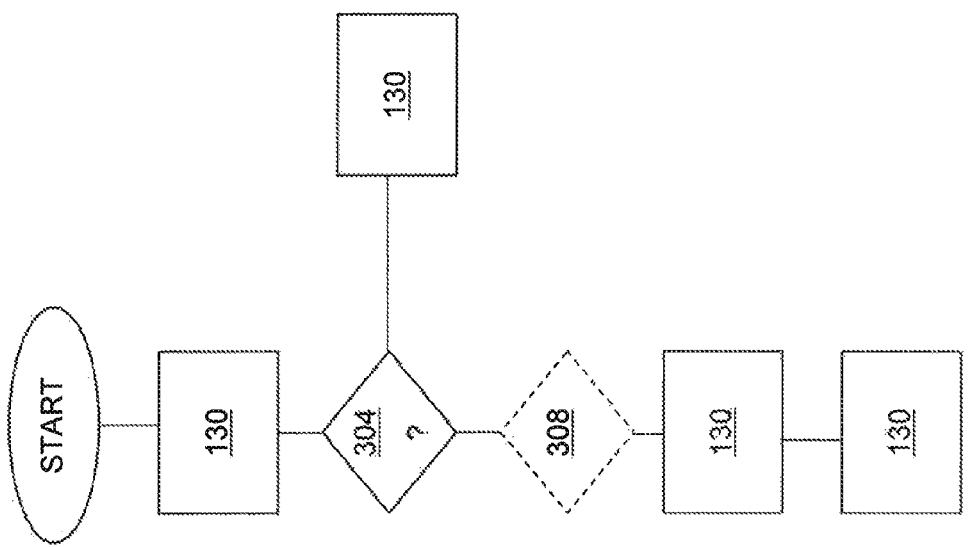

APPARATUS, SYSTEM AND METHOD FOR AUDIO-VISUAL CONTENT VIEWING USING ADVERTISEMENT CREDIT

CROSS-REFERENCE TO RELATED APPLICATIONS

This application is a continuation of U.S. patent application Ser. No. 13/065,883, filed Mar. 31, 2011, entitled "APPARATUS, SYSTEM AND METHOD FOR AUDIO-VISUAL CONTENT VIEWING USING ADVERTISEMENT CREDIT," which claims the benefit of priority to U.S. Provisional Patent Application No. 61/341,593, filed on Apr. 1, 2010, entitled "APPARATUS, SYSTEM AND METHOD FOR AUDIO-VISUAL CONTENT VIEWING USING ADVERTISEMENT CREDIT," the entirety of which is incorporated herein by reference as if set forth in its entirety.

BACKGROUND

1. Field of the Invention

The present invention relates to viewing audio-visual works, and, more particularly, relates to an apparatus, system and method for viewing audio-visual works based on credits accrued for viewing advertisements.

2. Description of the Background

Although multimedia viewing has become exceedingly popular using on-line mechanisms, most audio-visual content is still viewed by television set. Thus, numerous features are offered in conjunction with television sets to provide audio-visual content, including, but not limited to, the providing of standard or digital cable, satellite, on-demand showings, pay-per-view showings, and recorded showings, which may be recorded via, for example, a local personal digital video recorder (DVR) or a remote digital video recorder (rDVR), such as a network digital video recorder (nDVR). A DVR is thus a device that records, onto a digital media, multiple audiovisual programs.

Those skilled in the art will appreciate that audio-visual content may be provided, for example, from a cable head end or optical network central office-type facility via one or more regional servers, such as edge servers and/or gateway servers, for presentation from broadcast feeds, for recordation via a DVR, such as for presentation of switched digital, narrowcast, or like programming, and/or for presentation of rDVR programming from in-network, video on-demand or pay-per-view programming. These programming types may thus be provided by the head end- or central office-type facility, preferably through the regional servers or offices, such as the aforementioned edge servers, for example. Likewise, programming may be provided over a cellular or wireless network, such as via streaming, for storage local to a television set or for storage remote from the television set, for ultimate display on a television set, for example.

Further, the aforementioned audio-visual services may be provided to customers entitled to receive such services, which entitlements may be indicated by, for example, having an account with a provider of the services, and/or having equipment issued by the provider of the services, that is identified as indicating a customer who is entitled to the respective video service. The existence of such an account may be indicated by an identifier associated with, for example, a cable, satellite, cellular, wi-fi, or optical network receiver, such as a set top box (STB), tablet computer synched to a particular STB or television, or an internet protocol based television (IPTV), for example.

Irrespective of the audio-visual service ultimately provided to a television, or the manner of presentation of such a service, the available art is consistent in the manner of charging for the aforementioned services to a television set—namely, the manner of charging is by a subscription fee, such as a monthly subscription, quarterly subscription, annual subscription, or the like, and/or a per use fee, such as a bandwidth consumption fee, or a one-time fee generated when a user requests, such as via an STB, to download an on-demand movie for viewing to that STB. However, there are substantial drawbacks with the standard method(s) of charging for video services, and particularly with these methods when charging for DVR, rDVR, on-demand or pay-per-view services. One such drawback is that many customers of a provider are foreclosed from paying the provider for those services because those customers do not pay a monthly subscription fee to have the services available to those customers, for example. In other words, and by way of example, if a customer does not pay a monthly subscription fee to have DVR services available to that customer, the provider necessarily can gain no income from DVR services in relation to that customer. Thus, although most services made available by a provider are highly scalable, and although bandwidth is typically available to provide such scalable services, the revenue pool from which providers can gain revenue for certain services is limited based on the services already provided by the provider to those customers who would otherwise desire the services.

Therefore, the need exists for an alternative charging method for the provision of audio-visual services by a provider to one or more user televisions.

SUMMARY OF THE INVENTION

The present invention is and includes an alternative system and method for charging to provide audio visual services typically made available by providers, namely DVR services, rDVR services, on-demand services, broadcast and switched video television services, and pay-per-view services, for example. A customer/user may be enabled to access certain services to her television from a provider in exchange for viewing one or more commercials, advertisements, overlays, watermarks, logos, or the like, preferably in real time, before, during, or following viewing an audio visual work provided in accordance with the services. In order to insure advertising income to the provider in exchange for the provision of services, or discounted services, to the customer, it may optionally be assured that the customer must view advertisements shown to the customer in the entirety and in real time, even when services are typically provided on a receiving device connected to the television that generally allow for fast forward or skip features, for example.

Thus, the present invention provides an alternative charging apparatus, system and method for the provision of audio-visual services by a provider to one or more user televisions.

BRIEF DESCRIPTION OF THE FIGURES

Understanding of the disclosure will be facilitated by consideration of the following detailed description of the embodiments of the disclosure, taken in conjunction with the accompanying drawings, in which like numerals refer to like parts, and wherein:

FIG. 3 is a flow diagram illustrating a method of providing audio-visual content in accordance with the present invention.

DETAILED DESCRIPTION

It is to be understood that the figures and descriptions of the disclosure have been simplified to illustrate elements that are relevant for a clear understanding, while eliminating, for the purpose of brevity, many other elements found in typical apparatuses, systems and methods for providing audio-visual content to television viewers. Those of ordinary skill in the art will thus recognize that other elements and/or steps are desirable and/or required in implementing the disclosure. However, because such elements and steps are well known in the art, a discussion of such elements and steps is not provided herein. The disclosure herein is directed to all such variations and modifications to such elements and methods known to those skilled in the art.

As used herein, the elements of an audio-visual distribution network may be topically referenced in accordance with the meaning of such elements to one of ordinary skill in the pertinent arts. For example, reference to a DVR is to include, and/or may be alternately referred to in conjunction with, local and remote (rDVR) DVRs, personal video recorders (PVR), high definition DVRs (HDDVRs) and standard definition DVRS (SDDVRs), and the like. Also, as used herein, a DVR includes not only any hardware, but additionally any software, and the DVR service itself, necessary to provide the digital recording and/or digital video display capability discussed hereinthroughout. As such, as used herein, a DVR includes the providing of DVR-type services, such as the display of digital video to a television, to or by, for example, a set top box (STB), a satellite receiver, a fiber optic network receiver, a wi-fi receiver, a computing device, such as a tablet computer, an Internet Protocol television (IPTV), and like devices.

Figure 1:
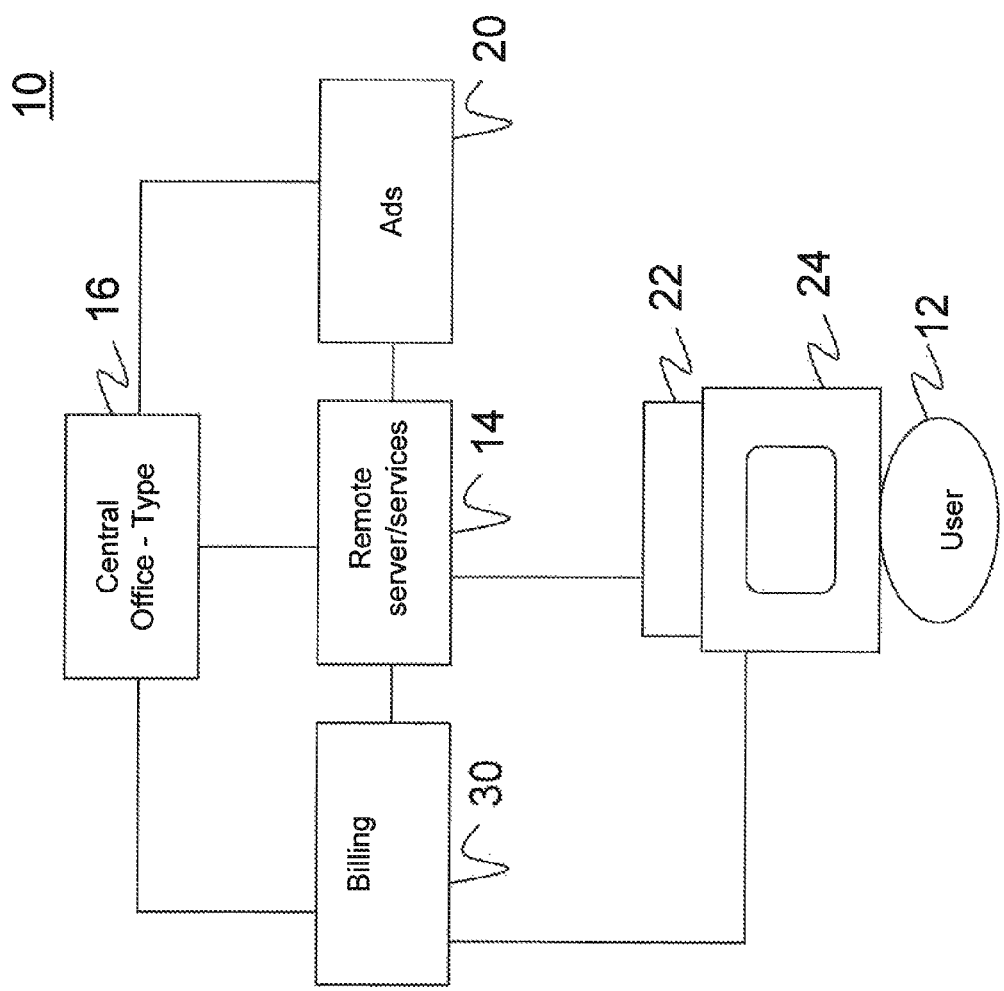
FIG. 1 is a block diagram illustrating a system and method for alternative charging to provide audio visual services typically made available by providers.

As illustrated in FIG. 1, the present invention provides an alternative system and method 10 for charging to provide, to a television, audio visual services typically made available by providers, such as cable television providers, namely DVR services, rDVR services, on-demand services, broadcast and switch video television services, and pay-per-view services 14, for example. As illustrated in FIG. 1, a customer 12 may be enabled to access certain services 14 from a provider 16 in exchange for viewing one or more commercials, advertisements, overlays, watermarks, logos, or the like 20, preferably in real time, before, during, or following viewing an audio visual work provided to a television 24, such as via, for example, a user device 22 associated with the user's television 24, in accordance with the services 14. As referenced, it may be preferable that, in order to insure advertising income to the provider in exchange for the provision of the services at no charge, or at a discount, to the customer, it be assured that the customer must view advertisements shown to the customer in the entirety and in real time, even when services are provided that generally allow for execution by the user device 22 of fast forward or skip features of the display on television 24, for example.

For example, a user may wish to use a DVR service in order to record, and later view, an audio-visual work. Either prior to allowing the user to perform the recording, such as in order to save bandwidth, or prior to the user viewing a recording, the user may be asked to agree to watch a predetermined number of advertisements, such as three advertisements, in real time prior to viewing the recorded program. Pursuant to viewing the three commercials, the user may be provided with the recorded program, either for free or at a discount from typical charges for such services, in accordance with a billing monitor 30. Of course, during viewing of the program, the user may further be asked to view one or more additional commercials in the entirety, such as every 15 minutes of viewing time, for example. Likewise, the system of FIG. 1 may be applicable to an on-demand environment, in which a user is asked to agree to view one or more commercials, in real time, either at the start of and/or throughout the requested on-demand program, and for which the user is offered the program at a free, or discounted, rate. As such, the present invention is not limited by the previous exemplary embodiments as to the services that may be delivered in accordance with the present invention. Additionally, the user may be asked to accept the continuous display, such as in the corner of a television screen, of a watermark, overlayed advertisement, banner advertisement, or the like, by way of non-limiting example.

Thereby, providers may make available to users who do not pay a monthly, quarterly, annual, or similar subscription fee, on a case-by-case use basis, scalable services that are already provided by the provider to other users of that provider. Further, it is estimated that the present invention may provide increased revenue on a per user, per month basis over the monthly subscription charges typically charged at present for, for example, DVR services, at least in that revenue may be generated from advertisers as well as users (unlike in current on-demand embodiments, for example), and from users who may use a service on a per-use basis more often than expected.

Figure 2:
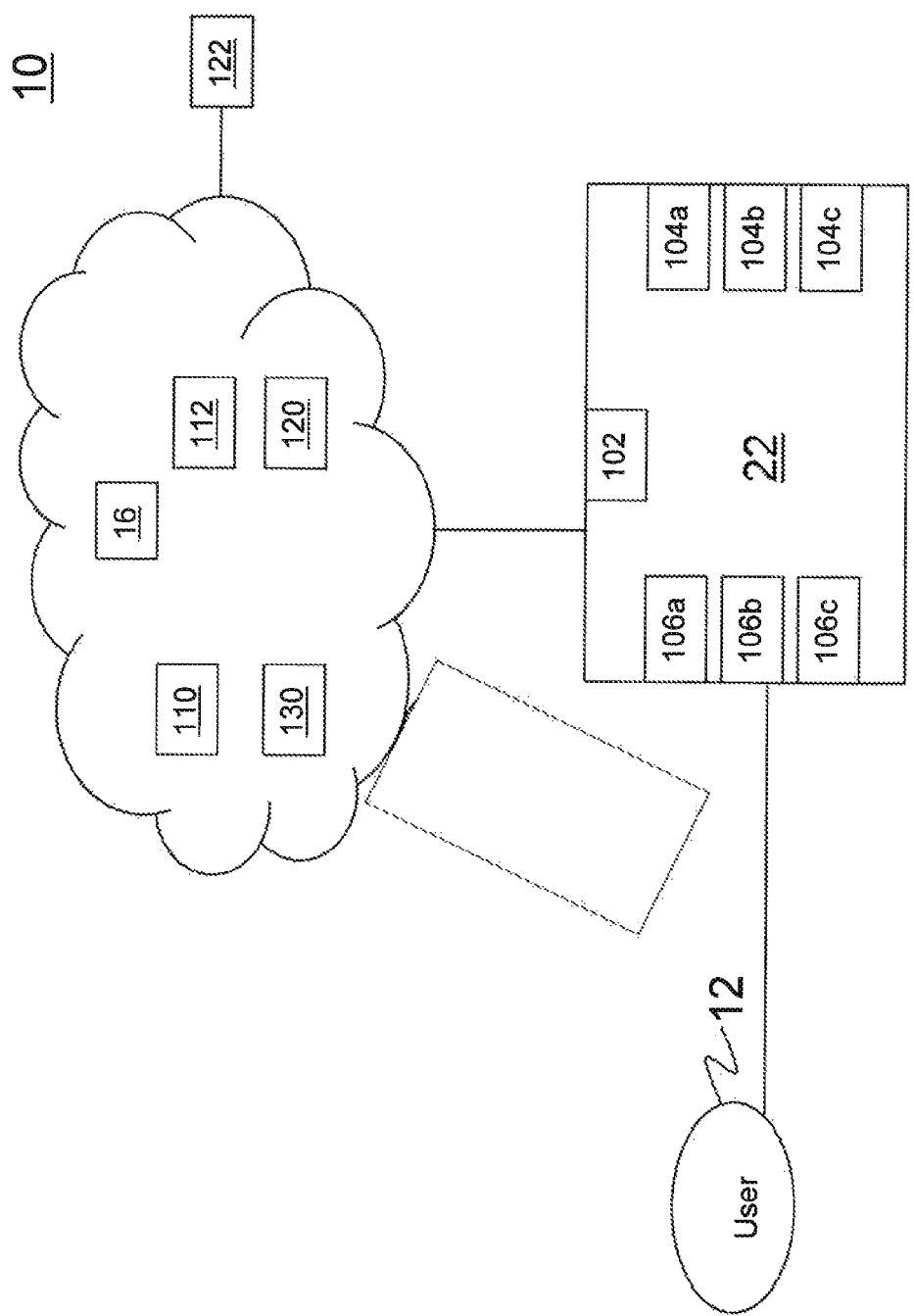
FIG. 2 is a block diagram illustrating a hardware interconnection for alternative charging to provide audio visual services typically made available by providers.

FIG. 2 illustrates with specificity an exemplary hardware embodiment of the hardware and firmware illustrated in, and discussed with respect to, FIG. 1. More particularly, FIG. 2 illustrates a user device 22, such as a STB, including a processor 102, at least one output to a television 104a, and a plurality of inputs 106a, b, c, including a user interface input 106b and one or more channel inputs 106a. The one or more channel inputs may be received from one or more remote and/or intermediate and/or regional servers, such as one or more edge servers 110, one or more gateway servers 112, one or more central office-type facilities 16, and the like. The processor 102 may have associated therewith memory serving to store computing code executable by processor 102, which computing code, when executed by processor 102, may cause to be effected the various steps and aspects discussed hereinthroughout.

Those skilled in the art will appreciate, in light of the disclosure herein, that user devices 22 may be serially connected for ultimate output of an audio-visual work on television 24. For example, a central office 16 may connect, such as directly to or via one or more gateways 112 or edge servers 110, a nDVR 22, and programs recorded on a nDVR 22 remote from television 24 may be accessed for display on television 24 by STB or tablet computer 22 located locally to television 24 upon viewing of the requisite advertisement(s) on television 24 as confirmed by STB or tablet computer 22. Each server 16, 110, 112 may have associated therewith a plurality of processors and computing memory, wherein the memory serves to store computing code executable by the processors, which computing code, when executed by a one or more of the processors, may cause to be effected the various steps and aspects discussed hereinthroughout.

User 12, interfacing with a user interface input to device 22, may request a service from one or more of the servers 16, 110, 112, such as the recordation of a program generally received by device 22 over the one or more channel inputs 106a. In such an instance, the user request constitutes a request for operability of the one or more servers 16, 110, 112 as a rDVR. Responsive to the user request, one or more of the servers may serve as the rDVR, in this exemplary embodiment, and may record the requested program. The rDVR may further key the recorded program to the identifier of that user's end-point user device 22 (i.e. the user device 22 that is directly connected, via wire or wirelessly, to television 24).

After making the request, and upon attempting to view the recorded program or continuously or at one or more points during viewing of the recorded program, the user may be served one or more advertisements in exchange for the user's use of the recordation and storage service. Such advertisements may be served from an in-network ad server 120 controlled by the provider, or from an out-of-network ad server 122, for example, wherein the ad server 120, 122 may be communicatively connected interstitially between nodes (such as between gateway server 116 and edge server 110) of the service provider network having a connection to user 12.

The advertisements selected may be selected for production from ad server 120, 122 based on a communication between the central office-type facility 16 and an intermediate and/or regional server 110, 112, based on communication directly from the central office-type facility 16 to the STB 22, based solely on selection by the intermediate and/or regional server 110, 112 providing the rDVR service, and/or by an external or third party server in communication with the intermediate and/or regional server 110, 112 providing the rDVR service or the STB 22, for example. The advertisement may or may not be based on a user profile 130 correspondent to the user and/or the user's use of at least one of the user device 22, which profile may be resident at the user device 22, at the central office-type facility 16, or at any other server in the network or external to the network. It goes without saying that the use of a STB, different server types, different advertisement and ad server types, and the profile types illustrated in FIG. 2 are exemplary in nature, and those skilled in the art will appreciate the operability of the present invention for numerous device types, server types and locations, advertisements, advertisement types, ad servers, and the like, in light of the discussion herein.

Needless to say, users who pay a monthly fee for, for example, a DVR services subscription, may additionally make use of the present invention, such as by receiving an account credit for each recorded program watched that is preceded by real time commercials at the request of the user. Thus, service subscription users, and/or users that typically pay for, for example, on-demand services in full on a per use basis, may make an alternative use of the present invention. As such, a user may be asked, such as prior to any use of certain services, whether the user wishes to view commercials in at least partial exchange for receiving the services, although such a request upon each use is not necessary in accordance with the present invention. Those skilled in the art will appreciate that the provision of commercials may actually conserve bandwidth through the use of the present invention, at least in that commercials may be shown while a program or service is downloaded, streamed, or the like to user device 22 local to television 24, for example.

Of course, the present invention may thus provide use for users in exchange for account credits, reduced subscription fees, reduced per use fees, waiver of per use fees, and the like, and may additionally provide income from users who do no presently pay subscription fees, per use fees, or the like. Such users not presently paying fees to providers include those users that do not make use of on-demand capabilities, DVRs, rDVRs, and/or who do not presently pay for broadcast and/or switched digital programming access, by way of non-limiting example.

Moreover, the present invention may allow for highly targeted advertising opportunities. For example, to the extent a user pays a subscription fee and has identifying information associated with the user's account and/or the user's STB usage, commercials may be provided to that user in accordance with that user's profile information. To the extent the user does or does not have an account with the provider, or does not have sufficient identifying profile information with the provider, the user's prior use, such as on-demand videos downloaded in exchange for commercials, STB usage, or programming recorded by a DVR service in exchange for commercials, may give a profile indication to the provider of the interest of the user, and thereby allow for targeted advertisements to be produced.

Further, the present invention may allow for multiple tiers of advertisers. For example, DVR services may have a sponsoring advertiser, included in or in addition to the commercials shown to the user. Such a sponsor advertiser for DVR services may always be the first ad shown to the user, operating under the assumption that the first ad is most likely to be viewed in full by the user, and/or the sponsor may have a logo overlayed on the DVR playback, for example. In certain circumstances, such as wherein the DVR programming is being viewed from a rDVR and/or via an IPTV, the logo, such as the overlay or watermark, may allow for user interaction, wherein a user may interact with a logo to access additional information with regard to the sponsor, either in association with metadata associated with the programming, or via link to an external website, for example.

As such, the advertisement in accordance with the present invention may be provided in any number of formats. For example, the advertisement may be provided on the full screen, prior to, or intermittently during, the audio-visual presentation. Alternatively, the advertisement may pop up, and/or may fill only a portion of the screen, with at least a portion of the programming, preferably in a paused mode, viewable beneath or aside the advertisement. Thereby, product tie-ins may be provided in conjunction with an advertisement. For example, a portion of the paused program may be predeterminately paused when a character in the programming is shown drinking a Coca-Cola product. The advertisement that is shown may then be an advertisement for Coca-Cola, and/or may include audio explaining that an upcoming portion of the program is "brought to you by the Coca-Cola company." Similarly, advertisements produced may include watermarks, interactive overlays or menus, flash widgets, and the like.

FIG. 3 is a flow diagram illustrating a method in accordance with the present invention.

In the illustrated method 300, a user communicatively connected to a provider network may request via a user interface device, at step 302, one or more provider services, such as DVR service, on-demand service, or the like. At step 304, the network provider assesses, such as at a central facility, whether the requesting user is a subscriber for the requested service. If the user is a subscriber for that service, the requested service is provided at step 306. If user is not a subscriber for that service at step 304, the user may optionally be asked at step 308 whether the user wishes to receive the service at a discounted or free cost on a per-use basis, pursuant to viewing advertisements in association with the requested service.

If the user indicates a desire to receive the service inclusive of advertisements, an ad server may be accessed at step 310, which accessing of the ad server may include an indication to the ad server of the preferences or profile of the requesting user, such as may be stored in association with an edge server, gateway server, or central facility, by way of non-limiting example. The requested service may then be provided to the user, at step 312, in conjunction with the advertisements served by the ad server.

Although the disclosure has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the disclosure as set forth in the claims hereinafter.

What is claimed:

1. A system for provision of at least one audio-visual service to a display device, comprising:
    a receiver capable of receiving an electronic user request for the audio-visual program;
    a server communicatively connected to said receiver capable of providing the audio-visual program responsive to the request;
    an ad server capable of serving one or more advertisements to the user in conjunction with the audio-visual program, wherein said ad server is communicatively connected to at least said server;
    at least one digital input to said receiver capable of receiving at least the audio-visual program from said server, and the one or more advertisements from said ad server corresponded to the audio-visual program at least partially over the communicative connection between said server and said ad server, and capable of electronically instructing the audio-visual service and the one or more advertisements to be displayed in a predetermined succession on the displayed device via said receiver;
    wherein viewing of the one or more advertisements comprise at least partial payment, by the user, for the audio-visual service.

2. The system of claim 1, wherein the audio-visual program comprises a digital video recording service.

3. The system of claim 1, wherein the audio-visual program comprises a video-on-demand program.

4. The system of claim 1, wherein said receiver comprises a set top box.

5. The system of claim 1, wherein said receiver comprises a tablet computer.

6. The system of claim 1, wherein said receiver comprises an internet protocol television.

7. The system of claim 1, wherein said server comprises a central facility.

8. The system of claim 1, wherein said server comprises an edge server.

9. The system of claim 1, wherein said server comprises a gateway server.

10. The system of claim 1, wherein the predetermined succession comprises display of at least one of the one or more advertisements immediately prior to at least a portion of the audio-visual program.

\* \* \* \* \*